A H. ALVERSON,

Assignor to G. GÜNTHER.

Cuttle-Fish Holder.

No. 8,503. Reissued Nov. 26, 1878.

Witnesses.
Chas. Wahlers.
Wm Miller

Inventor.
Andrew H. Alverson
by his attys.
Van Santvoord & Hauff

N. PETERS, PHOTO-LITHOGRAPHER, WASHINGTON, D. C.

UNITED STATES PATENT OFFICE.

ANDREW H. ALVERSON, OF NEW HAVEN, CONNECTICUT, ASSIGNOR TO GOTTLOB GÜNTHER, OF NEW YORK CITY, N. Y.

IMPROVEMENT IN CUTTLE-FISH HOLDERS.

Specification forming part of Letters Patent No. 178,893, dated June 20, 1876; Reissue No. 8,503, dated November 26, 1878; application filed November 11, 1878.

*To all whom it may concern:*

Be it known that I, ANDREW H. ALVERSON, of the city and county of New Haven, in the State of Connecticut, have invented a new and useful Improvement in Cuttle-Fish Holders, which improvement is fully set forth in the following specification, reference being had to the accompanying drawing, in which—

Figure 1:
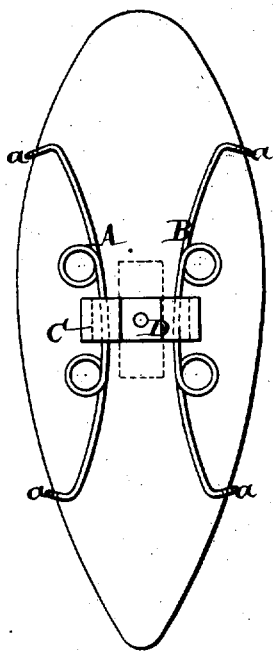
Figure 2:
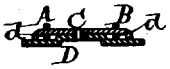

Figure 1 represents a rear view. Fig. 2 is a transverse section.

Similar letters indicate corresponding parts.

This invention relates to an improvement in device for securing cuttle-fish in bird-cages, the object being to make the fish attachable to the wires at any part of the cage, said device being applicable to holding other articles for the convenience of the bird in the cage.

My invention consists in a pair of spring-clamps combined with a fastening device adapted to engage with the wires of the cage, so that the holder can be readily secured to the cage at any convenient place, and detached whenever it may be desirable.

In the drawing, the letters A and B designate two springs alike in form, one being for the right and the other for the left hand side. The upper and lower end of each of these springs is turned outward to form a transverse hook, *a*, and both springs are secured to a common supporting plate or bar, C. With this supporting-plate is combined a fastening device, D, adapted to engage with the wires of a bird-cage. The fastening device shown in the drawing consists of a turn-button, which, together with the supporting-bar C, forms recesses *d* on each side of its pivot.

To apply my holder, the fish or whatever it may be is placed within the grasp of the hooks *a*, (seen in Fig. 1,) and the fastening device D is caused to engage with the wires of the cage.

With a fastening constructed as shown in the drawing this purpose may be effected by turning said fastening device on its pivot to the position shown in dotted lines in Fig. 1, so that it can be passed from the inside of the cage outward between two of the filling-wires, and then the fastening device is turned to the position shown in full lines in Figs. 1 and 2, so that the same embraces one of the filling-wires of the cage on each side of its pivot, said wires being situated in the recesses *d*, as indicated in Fig. 2.

By these means I am enabled to secure my holder at any part of the cage and to remove it or to change its position, as may be desired.

What I claim as new, and desire to secure by Letters Patent, is—

The combination, in a holder for cuttle-fish or other articles, of two springs, A B, constructed with a hook at each end, a suitable connection for the springs, and a fastening device adapted to engage with the wires of a bird-cage, substantially as described.

In testimony that I claim the foregoing I hereunto set my hand and seal this 1st day of November, 1878.

ANDREW H. ALVERSON. [L. S.]

Witnesses:
JOHN E. EARLE,
J. H. SHUMWAY.